United States Patent
Niemz

(10) Patent No.: US 9,132,858 B2
(45) Date of Patent: Sep. 15, 2015

(54) METHOD AND DEVICE FOR ASSISTING A DRIVER OF A MOTOR VEHICLE DURING A DRIVING MANEUVER

(75) Inventor: Volker Niemz, Rutesheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/236,964

(22) PCT Filed: Jul. 16, 2012

(86) PCT No.: PCT/EP2012/063917
§ 371 (c)(1),
(2), (4) Date: May 15, 2014

(87) PCT Pub. No.: WO2013/023854
PCT Pub. Date: Feb. 21, 2013

(65) Prior Publication Data
US 2014/0249740 A1    Sep. 4, 2014

(30) Foreign Application Priority Data
Aug. 12, 2011   (DE) .......................... 10 2011 080 930

(51) Int. Cl.
*G06F 17/10*   (2006.01)
*B60Q 1/48*   (2006.01)
*B62D 15/02*   (2006.01)

(52) U.S. Cl.
CPC ............ *B62D 15/029* (2013.01); *B62D 15/027* (2013.01); *B62D 15/028* (2013.01); *B62D 15/0275* (2013.01); *B62D 15/0285* (2013.01)

(58) Field of Classification Search
CPC ............. B62D 15/0285; B62D 15/027; B62D 15/028; G08G 1/161; G08G 1/168

USPC ............. 701/1, 25, 41, 96, 67, 68, 71, 72, 78, 701/80, 300–302, 400–541; 340/932.2–943, 988–996; 348/118
See application file for complete search history.

(56) References Cited

U.S. PATENT DOCUMENTS

2010/0156671 A1* 6/2010 Lee et al. ................... 340/932.2
2011/0063131 A1   3/2011 Toledo et al.

FOREIGN PATENT DOCUMENTS

| DE | 1984-3367 | * 3/2000 |
| DE | 10 2005 015396 | 12/2005 |
| DE | 10 2007 055389 | 5/2009 |
| DE | 10 2008 001648 | 11/2009 |
| DE | 10 2009 024062 | 3/2010 |
| DE | 10 2009 027650 | 1/2011 |
| DE | 10 2009 047283 | 6/2011 |
| EP | 2 234 085 | 9/2010 |

(Continued)

*Primary Examiner* — Muhammad Shafi
(74) *Attorney, Agent, or Firm* — Kenyon & Kenyon LLP

(57) ABSTRACT

A method for assisting a driver of a motor vehicle during a driving maneuver, in which the surroundings laterally next to the vehicle are registered using a first sensor in the rear region and a second sensor in the front region. With the aid of distance values of the first sensor from an object, taken one after another during a short travel segment, an object edge is determined and a contact point is established which is located at the place at which a straight line, extending the object edge and a straight line bordering the registration range of the second sensor, which does not register the object, on the side of the first sensor, intersect. Also described is a device for implementing the method.

8 Claims, 3 Drawing Sheets

(56) References Cited

FOREIGN PATENT DOCUMENTS

| JP | 2002-120677 | * | 4/2002 |
| JP | 2002/120677 | | 4/2002 |
| JP | 2003335196 A | | 11/2003 |
| JP | 2008290669 A | | 12/2008 |
| JP | 2010076760 A | | 4/2010 |

* cited by examiner

METHOD AND DEVICE FOR ASSISTING A DRIVER OF A MOTOR VEHICLE DURING A DRIVING MANEUVER

FIELD OF THE INVENTION

The present invention relates to a method for assisting a driver of a motor vehicle during a driving maneuver. Furthermore, the present invention relates to a device for carrying out the method.

BACKGROUND INFORMATION

Many different driver assistance systems already exist for assisting a driver of a motor vehicle during a driving maneuver, particularly those which assist the driver during parking and during leaving a parking space. In this case, the distance from objects in the surroundings of the motor vehicle is measured with the aid of distance sensors. The sensors are usually located in the front region and in the rear region of the motor vehicle.

During active parking, especially during parking in perpendicular parking spaces, it is necessary to measure the surroundings laterally next to the motor vehicle repeatedly, in order, for example, to detect scenes such as vehicle-space-column-vehicle and the like.

In systems currently known, two additional sensors are provided for this in the rear region, having a direction of view which is aligned essentially transversely to the travel direction.

Moreover, systems are also known which use ultrasonic sensors for the registration of the surroundings, and in which detected objects in the near field are entered into a map, to assist the driver in navigating. By doing this, one is able to see a column, which has been detected by the front or rear sensors, and which could represent an obstacle while passing it during the driving maneuver, since the original position of the detected column remains stored during the complete vehicle motion.

If detected objects, which have been entered into the map, are located in the travel route envelope of the vehicle, the driver may be warned accordingly.

One method for detecting the surroundings during a driving maneuver, in which the surroundings are registered and a map of the surroundings is set up, is discussed in DE-A 10 2009 024 062 or in DE-A 10 2008 001 648. In this case, the surroundings map is stored in each case in such a way that objects in the surroundings of the vehicle may also be followed even when they vanish from the visual range of the sensors.

However, the disadvantage of the known methods is that, in order to set up the surroundings map, the surroundings of the vehicle first have to be registered. This, however, is first of all not possible, particularly during maneuvers for leaving a parking space. The surroundings map is able to be set up only during the process of leaving the parking space. In this case, there is the danger, however, that based on a curve traveled during leaving the parking space, an object laterally next to the vehicle is not detected. It is also of little help to use the surroundings map of parking since, particularly by the changing occupation of neighboring parking spaces, the surroundings may change during the parking of the motor vehicle.

SUMMARY OF THE INVENTION

In the method according to the present invention for assisting a driver of a motor vehicle during a driving maneuver, the surroundings laterally next to the vehicle are registered using a first sensor in the rear region and a second sensor in the front region. With the aid of distance values of the first sensor from an object, taken one after another during a short travel segment, an object edge is determined and a contact point is established which is located at the place at which a straight line extending the object edge and a straight line bordering the registration range of the second sensor, which does not register the object, on the side facing the first sensor, intersect.

Because of the method according to the present invention, it is possible, already after a short travel section, for instance during leaving a parking space, to output a warning when the vehicle is approaching the calculated contact point. Since the contact point is located outside an object next to the vehicle, a collision with the object is also safely avoided in this manner.

In a first specific embodiment of the present invention, a trajectory is calculated, for carrying out the driving maneuver, along which the motor vehicle is being moved, the trajectory being determined in such a way that the motor vehicle does not touch the contact point established. The calculation of the trajectory permits carrying out a driving maneuver automatically or semiautomatically. The calculation of the trajectory, while taking into account the established contact point, ensures further that the driving maneuver is able to be carried out without the occurrence of an endangering situation, such as a collision with an object adjacent to the vehicle By an automatic driving maneuver one should understand, in connection with this invention, a driving maneuver in which both the longitudinal guidance as well as the transverse guidance of the vehicle, that is, braking, holding the speed of, and accelerating the vehicle and the steering of the vehicle are carried out automatically. In this case, the driver is responsible only for a monitoring function. In a semiautomatic driving maneuver it is possible, on the one hand, that the longitudinal guidance of the vehicle takes place automatically, for example, and information for the necessary steering motions is given to the driver, so that he is able to follow the calculated trajectory. Alternatively, it is also possible that the steering motions are carried out in automated fashion, and the driver is responsible for the longitudinal guidance of the vehicle. In a further embodiment of a semiautomatic driving maneuver, the driver receives information for the necessary steering motions, in order to follow the calculated trajectory, and both the longitudinal motion and the steering motions are carried out by the driver of the motor vehicle.

In one specific embodiment of the present invention, a distance warning is output, during the carrying out of the driving maneuver, when the motor vehicle approaches the established contact point during the driving maneuver. In this case, it is independent of whether the driving maneuver is being carried out automatically or semiautomatically, or whether the driver is carrying out the driving maneuver automatically. Based on the warning issued to the driver that the motor vehicle is approaching the established contact point, the driver is able to take measures in order to avoid collision with an object. He is thus able to stop the vehicle in time, for example, or he may change the direction of motion of the vehicle, in order to avoid the collision.

The output of the distance warning may be made acoustically, optically or haptically, for example. Combinations of the types of output may also be made. Thus it may particularly be the case, for example to output the distance warning acoustically or optically. An acoustical distance warning may take place by sending a signal tone, for example. In this case, the frequency at which the signal tone is transmitted, may increase with decreasing distance from the contact point.

Upon falling below a specified distance from the contact point, a continuous signal is sent. In the case of an optical distance warning, it is possible, for instance, to provide traffic s, the number of traffic beacons that light up increasing with decreasing distance to the contact point. Upon falling below a specified distance, it is furthermore possible, for instance, to provide traffic beacons changed in color, such as red traffic beacons. It is also possible, for instance, to provide a two-dimensional representation of the vehicle on an output device, e.g. a monitor of a navigation system. In this case, the position of the object is able to be shown directly in the illustration. The driver thereby obtains additional information on the location of the object, and he is thus able to initiate more specifically the measures required to avoid collision with the object.

In order to be able to carry out the driving maneuver as directly as possible and using as few driving moves as possible, it is furthermore advantageous if the straight line bordering the registration range of the second sensor that does not register the object on the side facing the first sensor is the straight line which borders the registration range, during the measurement, which is carried out using the shortest distance from the object. During a movement out of a parking space, for example, the measurement that is carried out at the shortest distance from the object is the first measurement carried out using the sensor. By contrast, in a parking process, the last measurement carried out using the sensor is the measurement which is carried out at the shortest distance from the object. By using the straight line to determine the contact point having the shortest distance from the object, the contact point is established so that the distance between the contact point and the object is as short as possible. In this way, a trajectory may be selected, along which the vehicle travels, which passes as close as possible to the object. Thereby it is possible, for example, during a process of leaving a parking space, to leave the parking space without getting into the lane of oncoming traffic. It is also thereby possible in some driving maneuvers, for instance, to execute these in one move, whereas in the case of a contact point that was farther away from the object, a plurality of moves would be required.

One may assume a maneuver of leaving a parking space as the driving maneuver, if directly before carrying out the maneuver, the engine of the vehicle has been started. On the other hand, a parking maneuver may be assumed if the engine of the motor vehicle has already been running for a longer period, and the motor vehicle has moved.

Besides a parking maneuver or a maneuver leaving a parking space, the driving maneuver may also be of any other type. Additional maneuvers are, for instance, maneuvers in narrow streets or alleys in which a tight curve is able to be negotiated, but perhaps not in one move. Driving on narrow streets or alleys may also be valued as maneuvering, even if the respective vehicles may be guided through in one move, but only little space is available to carry out the driving maneuver.

A device for carrying out the method includes a first sensor in the rear region and a second sensor in the front region of the motor vehicle, for registering the surroundings laterally next to the motor vehicle, as well as an arrangement for determining an object edge from distance values registered using the first sensor in successive measurements, and for establishing a contact point at the place at which a straight line extending the object edge and a straight line bordering the registration range of the second sensor, which does not register the object, on the side facing the first sensor, intersect.

The arrangement for determining the object edge from distance values registered using the first sensor in successive measurements and for establishing the contact point include, for example, a control unit of a driver assistance system. In this connection, it is possible, for example, to use a control unit of a parking assistance system. In this context, the control unit has to have a storage arrangement by which, in each case, the preceding measurements are able to be stored, in order to determine the object edge from the measured values. Furthermore, it is also necessary to store these appropriate data, particularly if the first measurement of the second sensor is used to determine the straight line bordering the registration area. The contact point is able to be determined using a processor and suitable software from the data registered using the sensors.

Distance sensors are normally used to register the surroundings. In this connection, the first sensor in the rear region and the second sensor in the front region may in each case, independently of each other, be an ultrasonic sensor, an infrared sensor, a radar sensor, a lidar sensor or an optical sensor. The sensor in the front region and the sensor in the rear region may be of the same type. However, different sensors may also be used. As optical sensors, within the scope of the present invention, one may understand video-based sensors in particular. When such a video-based sensor system is used, it may be accommodated in the side view mirror of the motor vehicle, for example. In this connection, the side view mirror of the motor vehicle counts as being in the front region.

Exemplary embodiments of the present invention are depicted in the figures and are explained in more detail in the description below.

DETAILED DESCRIPTION

Figure 1:
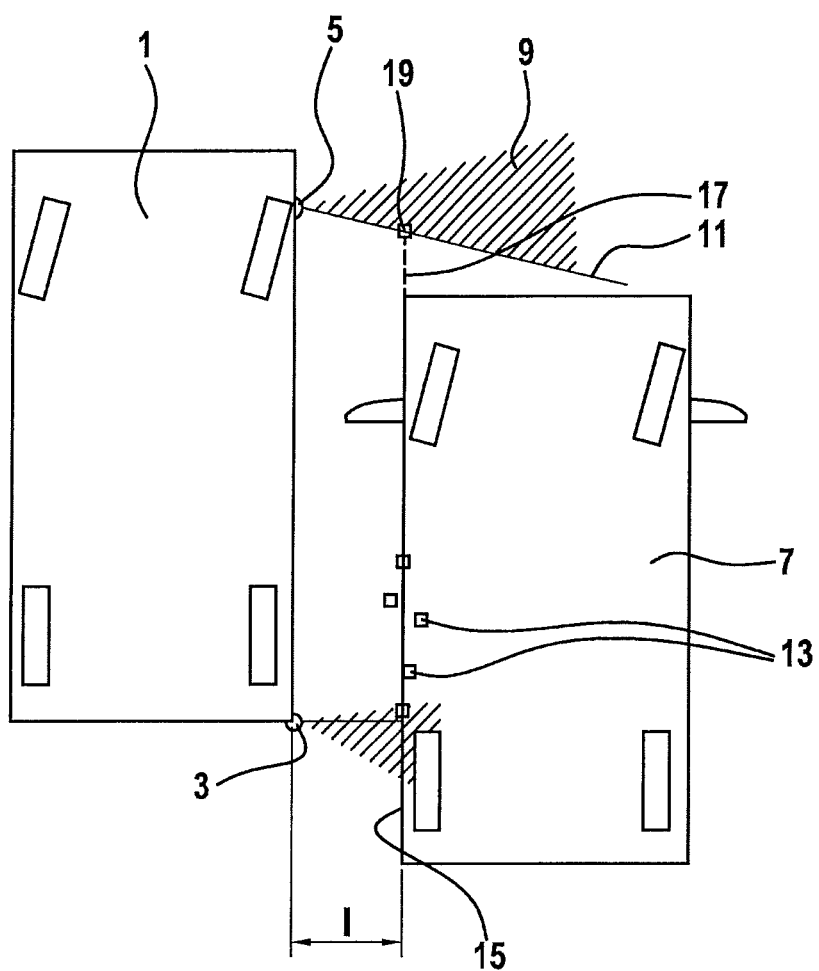
FIG. 1 shows a schematic representation of the method according to the present invention.

FIG. 1 shows schematically the method according to the present invention.

A motor vehicle 1, with which a driving maneuver is being carried out, registers the lateral surroundings using a first sensor 3 in the rear region and a second sensor 5 in the front region. In addition, by using further sensors in the front region and the rear region, the surroundings in front of and behind the vehicle are also registered. This is not shown in FIG. 1, since the registration of the surroundings in the front region and the rear region are not essential to the method according to the present invention, for determining the contact point.

An object is detected using first sensor 3 in the rear region of motor vehicle 1. In the specific embodiment shown here, the object is a parking motor vehicle 7. During a measurement using first sensor 3, distance I between motor vehicle 1 and motor vehicle 7 is measured.

Because of the offset position of motor vehicle 1 and parking motor vehicle 7, parking motor vehicle 7 is not located within registering range 9 of second sensor 5. A straight line 11 bordering registering range 9 of second sensor 5 on the side facing parking motor vehicle 7 is stored with respect to its position in a memory of the driver assistance system, using which the method according to the present invention is carried out.

Motor vehicle 1 moves during the driving maneuver to be carried out. During the movement of the motor vehicle, additional measurements are carried out using first sensor 3 and second sensor 5. Based on the positions of motor vehicles 1, 7 with respect to each other, a signal is received, even in response to a forward move of motor vehicle 1, only by first sensor 3 in the rear region of motor vehicle 1. This signal represents in each case measured distance I from parking vehicle 7. The measurement of distance I at various positions during the travel of vehicle 1 is shown in exemplary fashion by measuring points 13 in FIG. 1.

From the position of measuring points 13, an object edge 15 of parking motor vehicle 7 is determined. In this context, object edge 15 reflects the alignment of parking motor vehicle 7. In a next step, a straight line 17 is formed along object edge 15.

From the intersection of straight line 17 along object edge 15 and straight line 11 bordering registering range 9 of second sensor 5, a contact point 19 is established. According to the present invention, contact point 19 is assumed to be the front limitation of parking motor vehicle 7.

Now, if the driver of motor vehicle 1 approaches contact point 19 during the driving maneuver, a warning is output concerning the lateral approach to contact point 19. This gives the driver the chance to adjust the driving maneuver in such a way that a collision with parking motor vehicle 7 is avoided.

The warning output to the driver of motor vehicle 1 may be made optically and/or acoustically. An haptic warning is also conceivable. However, an optical warning may be used, possibly in connection with an acoustical warning.

In order to warn the driver optically, it is possible, for one thing, to provide light beams, for instance, which become longer with decreasing distance from contact point 19. Alternatively, it is also possible to provide LED's, for example, in which case an increasing number of LED's light up with a decreasing distance from contact point 19. When a specified minimum distance is undershot, the color may additionally be changed, in order to let the driver of motor vehicle 1 have an additional warning. In a corresponding manner, in the case of an acoustical warning, a repeating tone signal is usually sent, the frequency of the tone sent increasing with decreasing distance from contact point 19. When a specified minimum distance is undershot, a continuous tone is sent in order to let the driver have an additional warning.

Alternatively to the optical warning described above, using light beams or LED's, it is also possible to provide a two-dimensional representation within the range of view of the driver, for instance, on a display device such as a monitor of a navigation system or any other type of display device, in which motor vehicle 1 is shown in a bird's-eye view, and further measured objects in the surroundings of the motor vehicle. Here, contact point 19 may also be shown, and the driver may thus be shown an approach to contact point 19.

In addition or alternatively to the warning of the driver during a driving maneuver carried out by the driver, it is also possible to use the method according to the present invention in automatic or semiautomatic driving maneuvers. In this case, a trajectory, along which the driving maneuver is to be carried out, is calculated so that the vehicle moves in such a way that a contact with contact point 19 does not take place.

Figure 2:
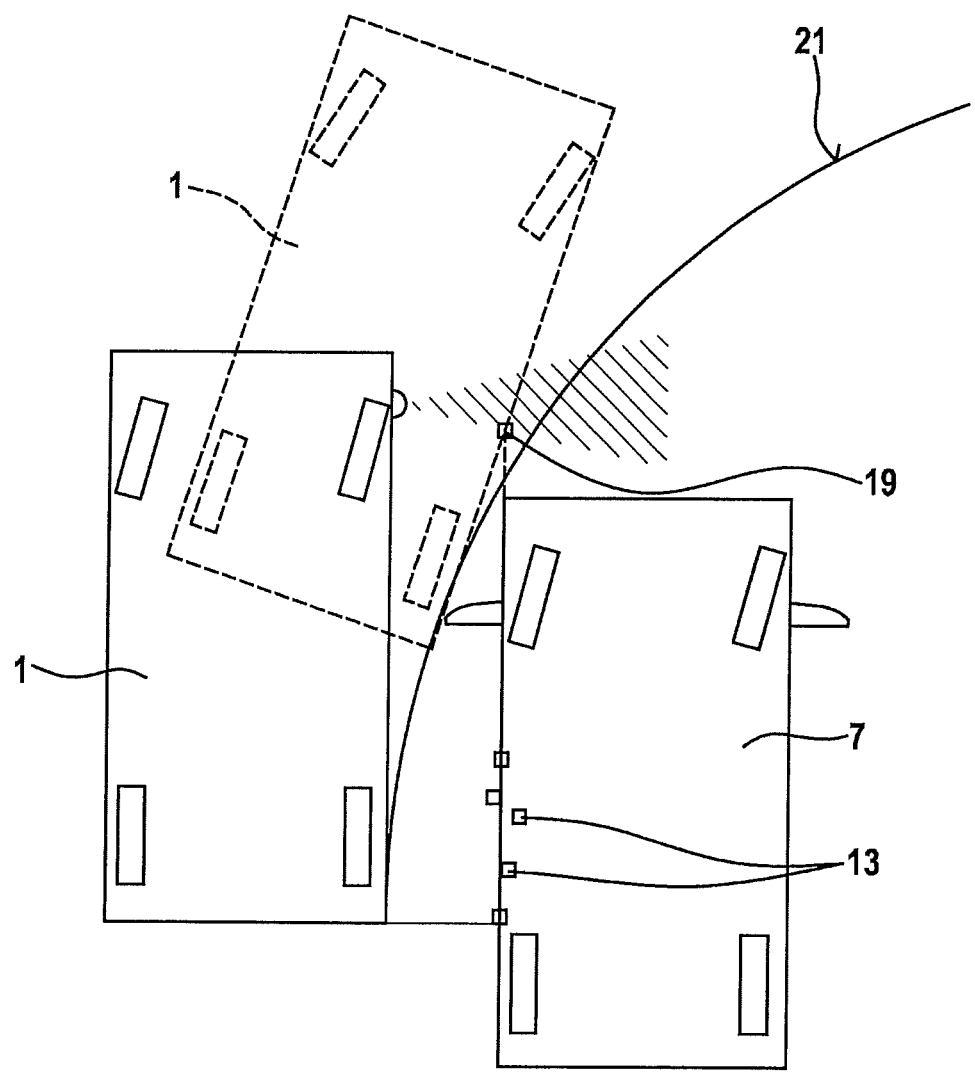
FIG. 2 shows a maneuver of leaving a parking space while taking into account the established contact point.

A trajectory for a maneuver of leaving a parking space is shown, for example, in FIG. 2.

Motor vehicle 1 moves with its rear right corner along a trajectory 21, in order to leave a parking space. The parking space, in this instance, is bordered by parking motor vehicle 7. As shown in FIG. 1, contact point 19 is first calculated. With the aid of contact point 19, trajectory 21 is then determined, along which the vehicle is able to be moved without a collision threatening with parking motor vehicle 7. Since it is known that contact point 19 is outside parking motor vehicle 7, since contact point 19 is located on the straight line bordering the registering range of second sensor 5, and no object has been detected using second sensor 5, it is possible that trajectory 21 is guided through contact point 19. Guiding the trajectory around contact point 19 may be preferred more, however.

The calculation of trajectory 21 in such a way that that it is guided around contact point 19 may be particularly preferred if the driver is still responsible for tasks such as steering the vehicle, that is, a semiautomatic driving maneuver is being carried out.

In FIG. 2, the position of the motor vehicle is shown dashed during the carrying out of the driving maneuver, in which the motor vehicle is located in its closest position to contact point 19, and thus to parking motor vehicle 7. In this context, the movement of motor vehicle 1 runs in such a way that no collision takes place with parking motor vehicle 7, and motor vehicle 1 is thus able to leave the parking space without danger.

Figure 3:
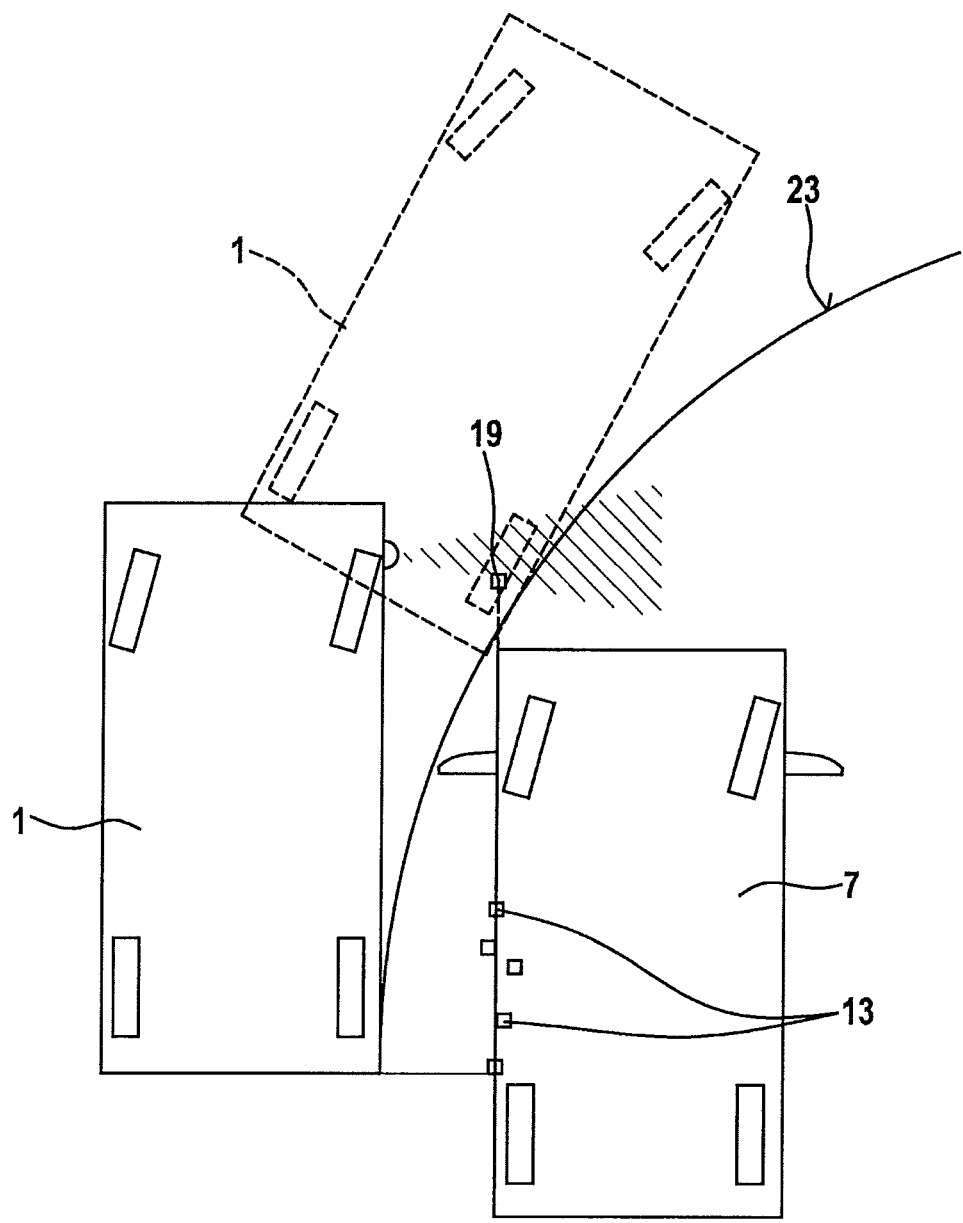
FIG. 3 shows a maneuver of leaving a parking space, in which the established contact point is not taken into account.

In FIG. 3, by contrast, the course of trajectory 23 is shown, which leads to a collision with parking motor vehicle 7.

In the specific embodiment shown in FIG. 3, trajectory 23 of the rear right end of motor vehicle 1 does not lead through or around contact point 19 but past contact point 19 on the side facing parking motor vehicle 7. This leads to the result that motor vehicle 1 is guided in too tight a curve around parking motor vehicle 7, and a collision will occur at the place at which trajectory 23 runs most closely past parked motor vehicle 7.

By the determination of contact point 19 and its consideration, such collisions as shown in FIG. 3 are able to be avoided. The safe leaving of a parking space is made possible, without the danger of doing damage by objects lying around the motor vehicle, and with that, naturally also without damage to one's own motor vehicle 1.

What is claimed is:

1. A method for assisting a driver of a motor vehicle during a driving maneuver, the method comprising:
   registering surroundings laterally next to the motor vehicle using a first sensor in a rear region and a second sensor in a front region;
   determining, an object edge with the aid of distance values of the first sensor from an object recorded one after the other during a brief travel segment;
   determining, with the aid of the first sensor, a first straight line that extends the object edge;
   determining with the aid of the second sensor, a second straight line that borders the registration range of the second sensor, which does not register the object; and
   establishing, with the aid of a control unit of a driver assistance system, a contact point which is located at the intersection of the first straight line and the second straight line, on the side facing the first sensor.

2. The method of claim 1, further comprising:
   determining a trajectory, for carrying out the driving maneuver, along which the motor vehicle is moved, the trajectory being determined so that the motor vehicle does not touch the established contact point.

3. The method of claim 1, further comprising:
   outputting a distance warning, during the carrying out of a driving maneuver, when the motor vehicle approaches the established contact point during the driving maneuver.

4. The method of claim 1, wherein the second straight line limiting the registration range of the second sensor, which does not register the object, on the side facing the first sensor is the straight line which limits the registration range during the measurement that is carried out using the shortest distance from the object.

5. The method of claim 1, wherein the driving maneuver is one of a parking maneuver, a maneuver leaving a parking space and a maneuvering action.

6. A device for assisting a driver of a motor vehicle during a driving maneuver, comprising:
- a first sensor in a rear region of the motor vehicle;
- a second sensor in a front region of a motor vehicle, the first sensor and the second sensor being for registering the surroundings laterally next to the motor vehicle; and
- a determining arrangement to determine an object edge from distance values registered using the first sensor in successive measurements, and for establishing a contact point at the place at which a first straight line extending the object edge and a second straight line that borders the registration range of the second sensor, which does not register the object, on the side facing the first sensor, intersect.

7. The device of claim 6, wherein the determining arrangement to determine the object edge from the distance values registered using the first sensor in successive measurements and for establishing a contact point include a control unit of a driver assistance system.

8. The device of claim 7, wherein the first sensor in the rear region and the second sensor in the front region are in each case, independently of each other, one of an ultrasonic sensor, an infrared sensor, a radar sensor, a lidar sensor, and an optical sensor.

* * * * *